United States Patent
Dils et al.

(10) Patent No.: US 6,658,976 B2
(45) Date of Patent: Dec. 9, 2003

(54) ERGONOMIC MITER SAW HANDLE

(75) Inventors: Jeffrey M. Dils, Simpsonville, SC (US); Kenneth M. Brazell, Piedmont, SC (US); Charles M. Wacker, Chandler, AZ (US)

(73) Assignee: One World Technologiess, Inc., Hamilton (BM)

( * ) Notice: Subject to any disclaimer, the term of this patent is extended or adjusted under 35 U.S.C. 154(b) by 195 days.

(21) Appl. No.: 09/771,775

(22) Filed: Jan. 29, 2001

(65) Prior Publication Data

US 2002/0100352 A1 Aug. 1, 2002

(51) Int. Cl.[7] .................................................. B26D 3/02
(52) U.S. Cl. ........................ 83/471.3; 83/473; 83/490; 83/581
(58) Field of Search ........................... 30/161, 31, 314, 30/155; D8/99; 83/473, 468.2, 468.3, 468.7, 522.25, 581, 490, 471.3

(56) References Cited

U.S. PATENT DOCUMENTS

| | | | | |
|---|---|---|---|---|
| 4,428,266 A | * | 1/1984 | Keddie | 83/767 |
| 4,934,233 A | * | 6/1990 | Brundage et al. | 83/397 |
| 5,297,463 A | * | 3/1994 | O'Banion et al. | 83/468.3 |
| D346,173 S | | 4/1994 | Price | |
| 5,339,572 A | | 8/1994 | Eicher | |
| 5,357,834 A | * | 10/1994 | Ito et al. | 83/471.3 |
| D352,509 S | | 11/1994 | Kriaski et al. | |
| D366,491 S | | 1/1996 | Chang | |
| 5,564,323 A | * | 10/1996 | Sasaki et al. | 83/471.3 |
| 5,681,214 A | | 10/1997 | Kleider et al. | |
| D388,442 S | | 12/1997 | Shibata et al. | |
| D389,494 S | | 1/1998 | Chen | |
| D390,766 S | | 2/1998 | Price et al. | |
| D391,973 S | | 3/1998 | Price et al. | |
| 5,778,747 A | | 7/1998 | Chen | |
| D400,215 S | | 10/1998 | Price et al. | |
| D409,066 S | | 5/1999 | Welsh | |
| 5,957,021 A | * | 9/1999 | Meredith et al. | 83/397 |
| D415,001 S | | 10/1999 | Welsh | |
| 5,969,312 A | * | 10/1999 | Svetlik et al. | 200/61.85 |

OTHER PUBLICATIONS

"Miter Saw Profiles", Journal of Light Construction, Aug. 1999, p. 48–52.
Makita Product Brochure, p. 44–45.
Bosch Product Brochure, p. 196–197.

* cited by examiner

Primary Examiner—Allan N. Shoap
Assistant Examiner—Phong Nguyen
(74) Attorney, Agent, or Firm—Brooks Kushman P.C.

(57) ABSTRACT

An ergonomic miter saw is provided having a base and a saw arm assembly with the saw arm assembly pivotally affixed at a fixed end to the base and provided with a distal end having a handle extending outwardly therefrom. The central region of the arm assembly includes a rotary spindle supporting a cutting disk. A handle is preferably provided with an elongate grip portion sized for the user's fingers and a palm pad portion extending outwardly therefrom to underlie the heal of the user's hand to minimize bending torque on the user's wrist as the arm is lowered. Ideally, the handle is rotated in a direction opposite that the cutting disk is tilted. Preferably, the handle is adjustable oriented about the arm axis in a direction opposite that the saw blade is tiltable so that the deviation for horizontal of the handle can be minimized when the miter saw is used in a tilted cutting disk mode.

11 Claims, 3 Drawing Sheets

ERGONOMIC MITER SAW HANDLE

TECHNICAL FIELD

The present invention relates to miter saws and particularly to ergonomic handles designed therefor.

BACKGROUND ART

Motorized miter saws having a circular saw blade are generally constructed of three basic designs; a simple chop saw design where the saw blade is mounted on an arm which is pivoted to plunge into the work piece. A second design can be found where the orientation of the arm can be inclined relative to the saw fence to provide simple miter cuts throughout a range of cutting angles. Miter saws are additionally constructed of the compound miter saw design in which the arm that plunges into and out of the workpiece is adjustable about a generally vertical miter axis as well as a horizontal bevel or tilt axis to enable a user to cut the compound miter. The third common type of miter saw is a sliding compound miter saw which is similar to a compound miter saw, however, the arm assembly is free to move horizontally along a slide to enable wider boards to be cut for a given blade diameter, than can be cut by a conventional miter saw.

Miter saws all typically have a handle at the distal end of the arm for the user to grasp as the blade is plunged into the workpiece. In the case of a sliding compound miter saw the handle also enables the user to horizontally translate the saw blade relative to the workpiece. Handles have been made of a variety of different shapes. The three common shapes are a vertically oriented pistol grip handle, a horizontal D-handle, or a simple elongate straight or slightly curved outwardly extending handle sometimes referred to as a "banana" handle. The "banana" handles are commonly used in simple miter saws such as chop saws, while pistol grip or D-shaped handles of the vertical or horizontal design, are more frequently used in compound miter saws and sliding compound miter saws.

Due to the high degree of adjustability of a sliding compound miter saw, coupled with the high degree of handle movement, the handle is frequently difficult or awkward to grasp during all or portions of the plunge cutting motion, particularly at extreme tilt angles. Additionally, especially when making repeated plunge cuts during a large construction project, a user's wrist will tire. The object of the present invention is to provide a miter saw having a handle which is ergonomically designed to minimize user fatigue by comfortably orienting the handle relative to the operator, even during extremely inclined cuts, and by minimizing torque on the user's wrist.

DISCLOSURE OF INVENTION

Accordingly, the miter saw of the present invention is provided having a base and arm assembly having a fixed arm and pivotally attached to the base, a free distal end forming a handle spaced outwardly therefrom to be grasped by a user and a central region provided with a rotary spindle supporting a cutting disk. The handle in the preferred embodiment is provided with a transversely elongated grip portion sized to be grasped by a user's fingers which wrap thereabout and a palm pad portion extending outwardly toward the user from the grip portion for a sufficient distance to underlie the heel portion of the user's palm. As the user grasps the handle and lowers the cutting disk into the workpiece, the palm pad portion transmits a downward force from the user's hand to the handle thereby minimizing the torque exerted on the user's wrist.

A preferred handle design has the handle oriented relative to an arm axis so that the handle is generally horizontal when the arm is viewed in a lower position. The arm further preferably includes a rotatable joint enabling the orientation of the handle to be varied about the arm axis and fixed at a comfortable position selected by the user for a particular compound miter cut. Most preferably, the miter saw of the present invention will include both the palm pad and the rotatable joint features, however, miter saws of the present invention could be fabricated only using one of the palm pad or rotatable joint features.

BEST MODE FOR CARRYING OUT THE INVENTION

Figure 1:
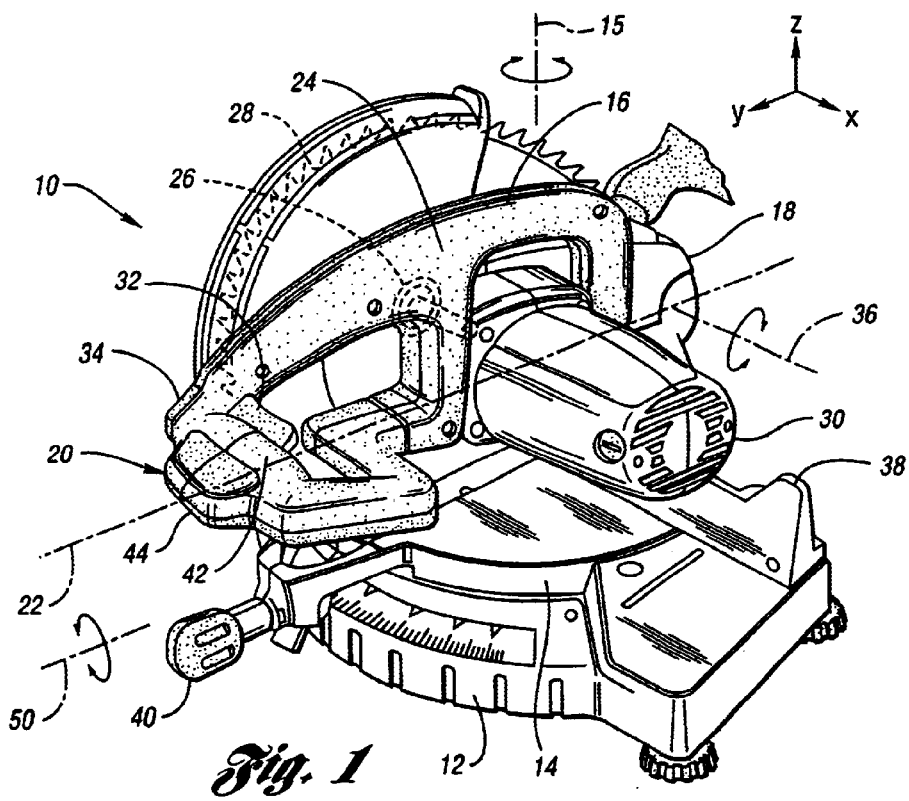
FIG. 1 is a perspective view of the miter saw of the present invention.

Miter saw 10 illustrated in FIG. 1, discloses a preferred embodiment of the present invention. Miter saw 10 is made up of a base 12 having a rotary table 14 mounted thereon, pivotal about a generally vertical Z axis 15. An arm assembly 16 is provided with a fixed end 18 pivotally attached to the rotary table portion 14 of base 12. Arm assembly 16 is further provided with a handle 20 formed at the free distal end of the arm assembly 16 opposite fixed end 18. The arm assembly 16 extends along an arm axis 22 and has an arm central region 24 located between fixed end 18 and handle 20. Arm central region 24 is provided with a rotary spindle 26 which carries a rotary cutting disk 28. Rotary cutting disk is typically a circular saw blade or alternatively it can be an abrasive wheel. Rotary spindle 26 is operatively driven by an electric motor 30 via a conventional gear reduction mechanism not shown.

In FIG. 1, arm assembly 16 is shown in the lowered position. Arm assembly 16 will be typically biased to the raised upper position by a spring so that rotary cutting disk 28 will be spaced above the upper surface of rotary table 14. When it is desired to be cut, the user will grasp handle 20 and turn on the saw by simultaneously depressing trigger 32 and interlock 34 with the user's finger and thumb, respectively, to cause the motor to rotate the cutting disk 28. When the cutting disk 28 is rotating at full speed, the user pivots arm 16 to a lower position. As the fixed end of arm 18 pivots about arm pivot axis 36, which is parallel to the axis of rotary spindle 26 cutting disk 28 severs the workpiece. Base 12 is further provided with a fence 38 which jointly with the upper surface of base 12 and rotary table portion 14, supports a wooden board or the like during the cutting operation. In FIG. 1, rotary table portion 14 is oriented so that the plane of blade 28 is perpendicular to fence 38 for making a 90° cut. When it is desired to make a conventional miter cut, rotary table 14 is turned by releasing and re-locking table lock 40 to incline the plane of a cutting disk 28 relative to fence 38. A similar tilt lock mechanizing enables the user to vary the title angle for making a bevel cut or a compound cut.

Figure 2:
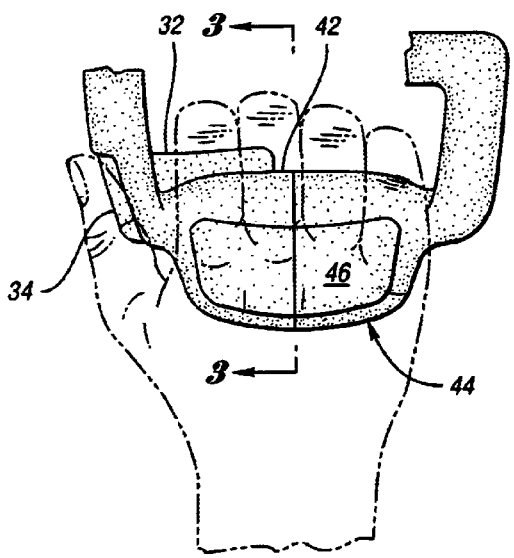
FIG. 2 is a partial top plan view illustrating the orientation of a user's hand relative to the miter saw handle in FIG. 1.
Figure 3:
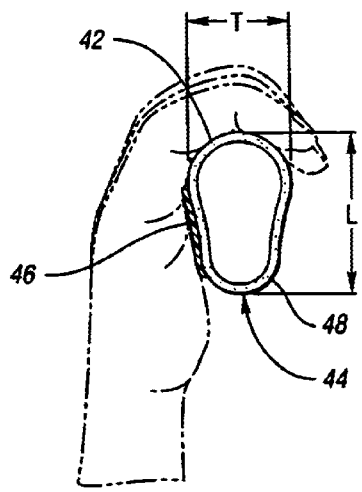
FIG. 3 is a side elevational view showing the orientation of the user's hand taken along line 3—3 of FIG. 2.

Handle 20 is shown in an enlarged plan view in FIG. 2 with the user's right hand in phantom outline grasping the handle. Trigger 32 and interlock 34 are oriented relative to handle 20 to be proximate the user's index finger and thumb. Handle 20, which can be seen in FIG. 2 and the cross-sectional side view of FIG. 3, is made up of an elongate grip portion 42 and a palm pad portion 44. The elongate grip portion 42 is sized to enable a user's fingers to wrap thereabout. The palm pad portion 44 extends outwardly toward the user in a sufficient distance to underlie the heel portion of the user's palm as illustrated in FIG. 3. This design minimizes torque on the user's wrist as a user pushes downwardly on handle 20 to lower the arm assembly 16.

Preferably palm pad portion 44 is provided with a soft palm pad member 46 supported on the structural palm pad member 48 to further facilitate user comfort during extended periods of use. Ideally, the elongate grip portion 42 will have a maximum vertical thickness T illustrated in FIG. 3 which is between 1.5" and 2.5". Further, the handle will have a length L measured along the arm axis of between 3" and 4.5". This length provides sufficient support for the heel of the user's palm during the cutting motion to minimize the bending torque exerted on the user's wrist.

Figure 4:
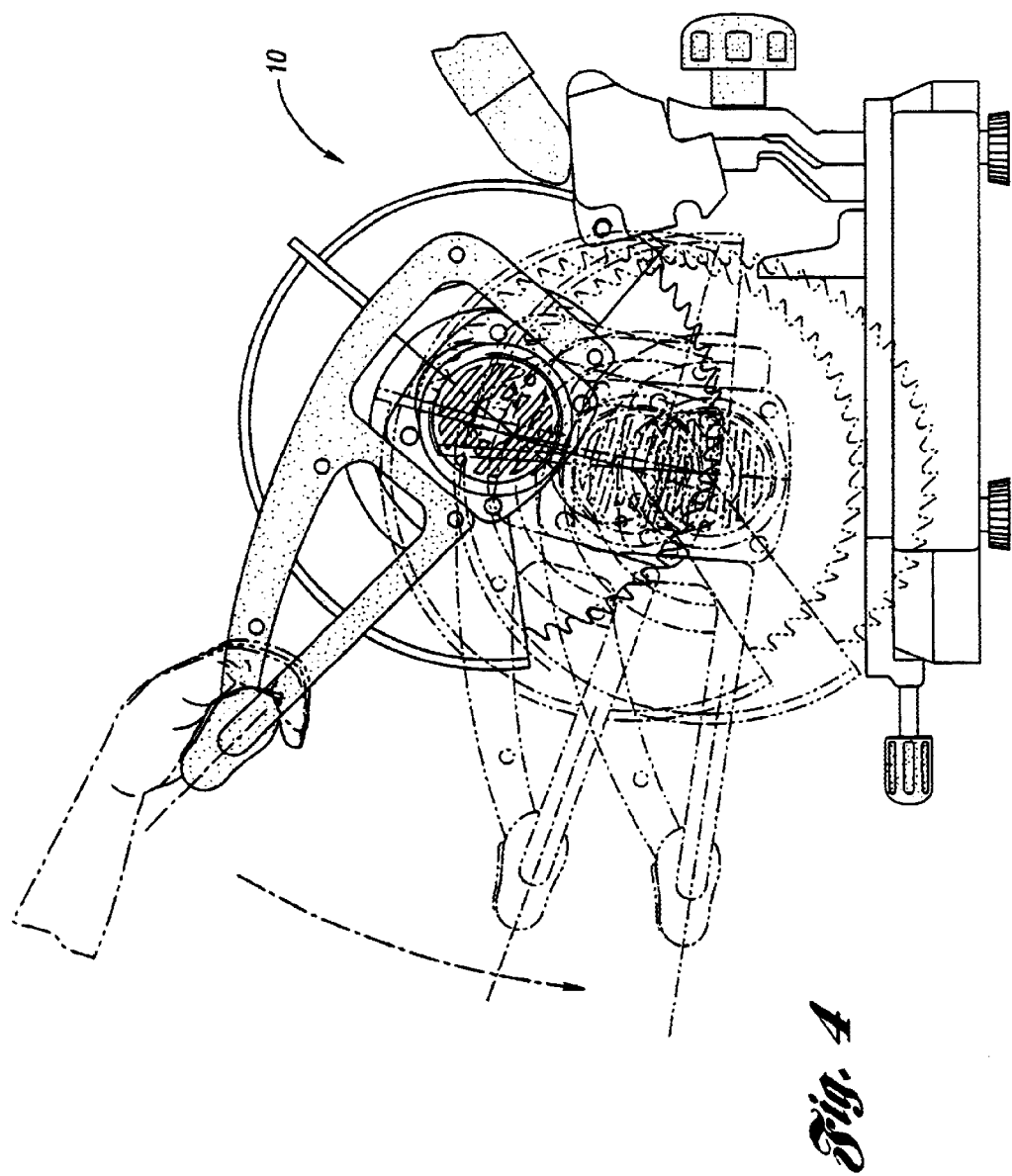
FIG. 4 is a right side elevational schematic view illustrating the orientation of a user's hand and arm relative to the miter saw during a plunge cut.

An illustration of the orientation of the user's hand relative to handle 20 and arm assembly 16 of miter saw 10 is shown in FIG. 4. Handle 20 is generally oval or egg shaped in cross-sectional view as illustrated in FIG. 3. The handle should have a transverse length measured in the X axis when the cutting disk 28 is square to table 14 which is wide enough to accommodate a user's hand. In the embodiment illustrated, handle 20 is generally U-shaped in plan view, however, a pistol grip design supported only on one side of the elongate grip portion 42 can alternatively function. Preferably, palm pad portion 44 is no wider than the user's hand. The palm pad portion should not ideally extend to the left toward interlock 34 beyond the user's palm so as to not interfere with the motion of the user's thumb when depressing the interlock and trigger buttons.

In miter saw 10 embodiment, elongate grip portion 42 is generally parallel to spindle 26. In that way, when the cutting disk 28 is oriented perpendicular to table 14, elongate grip portion 42 is horizontal. Alternatively, elongate grip portion could be rotated clockwise slightly when looking at the handle along arm axis 22 from the handle end. Rotating the elongate handle portion 20° to 30° clockwise does not adversely affect performance when the cutting disk 28 is perpendicular to table 14 and can significantly improve user comfort as in the case of a compound miter saw, when the plane of cutter cutting disk 28 is tilted counter-clockwise about a Y axis 50. It should be noted when arm assembly 16 and cutting disk 28 is tilted about the Y axis 50, arm pivot axis 36 likewise rotates and becomes inclined from horizontal. Since compound miter saws are typically capable of moving up to 45° to the left, i.e. counter-clockwise about the Z axis when viewed from the front rotating the handle, 20° to 30° is a good compromise for a fixed handle location to provide comfort when making square cuts as well as bevel cuts throughout the range of band motion which is typically 45° counter-clockwise.

Figure 5:
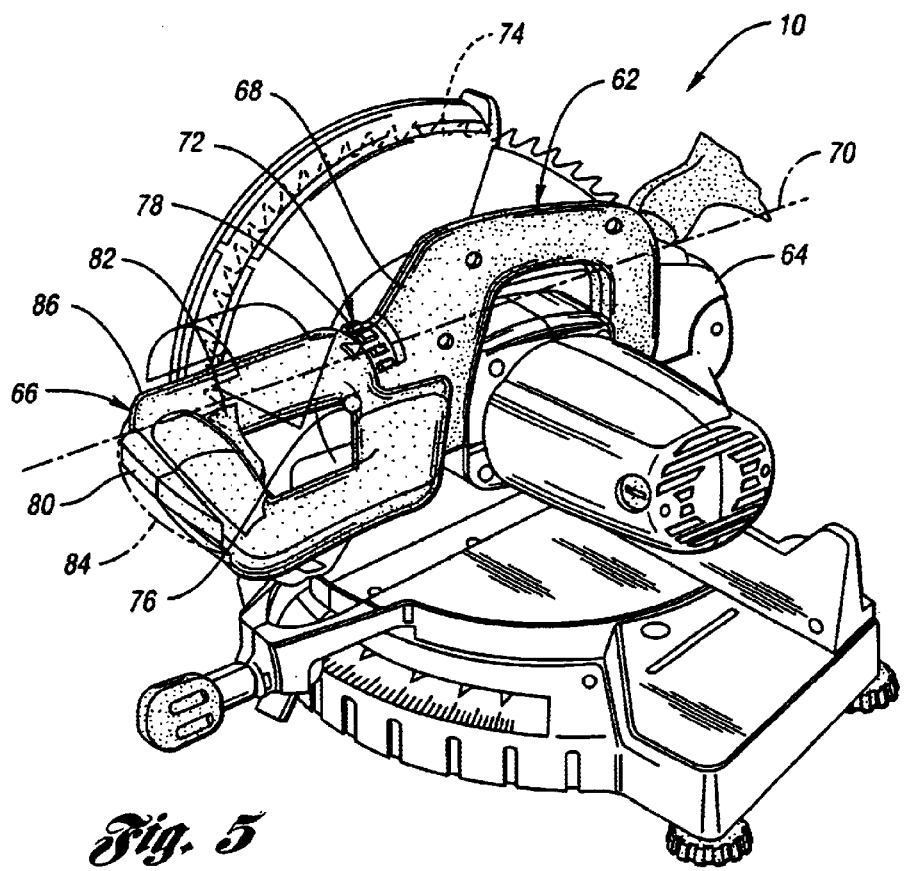
FIG. 5 is a perspective view of an alternative miter saw embodiment.
Figure 6:
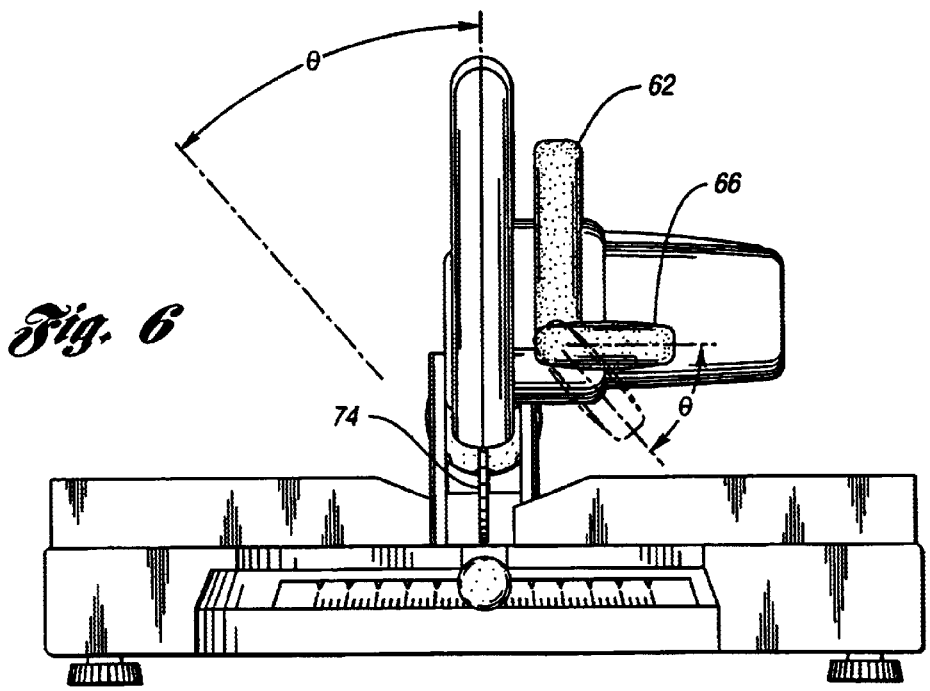
FIG. 6 is a front side elevational view of the miter saw of FIG. 5.

An alternative embodiment of the present invention is illustrated in miter saw 60 shown in FIG. 5. Miter saw 60 differs from miter saw 10 only in the construction of arm assembly 62. Arm assembly 62 is made up of a fixed end 64, a handle 66 at the opposite end of the arm assembly 62 and a central region 68, extending therebetween along arm axis 70. Arm assembly 62 includes a rotatable joint 72 which enables handle 66 to be rotated generally about handle axis 70 so the orientation of the handle can be varied relative to cutting disk (blade or abrasive wheel) 74. Preferably, handle 66 is free to rotate at the rotatable joint through a range of motion comparable to the range of tilt of the cutting disk relative to the base. For a miter saw capable of tilting to the left counter-clockwise, handle 66 should be capable of rotating clockwise so that the deviation of the handle from horizontal can be minimized. A one to one correspondence of the range of handle motion and the range of blade tilt is convenient but not necessary. A slight handle inclination from horizontal and extreme blade tilt angle is acceptable. Ideally, the handle is capable of moving between 0° and 30° clockwise, if the miter saw tilts counter-clockwise 45°. More preferably, in instances when the miter saw is capable of tilting both clockwise and counter-clockwise, the miter saw handle 66 is capable of up to 40° rotation in the direction opposite that of blade tilting.

In order to facilitate rotation of handle 66, a detent button 76 is provided which when depressed by the user to enable the handle to be rotated. When the detent button 76 is released, a conventional spring bias mechanism locks the handle in position. A scale 78 and pointer is likewise provided on the rotatable joint 72 to provide a visual indication as to the amount of handle rotation about axis 70.

It should be noted that the rotatable handle feature shown in miter saw 60 can be used in conjunction with a palm pad described previously in reference to miter saw 10 or in a conventional pistol grip or D-handle type miter saw handle not having a palm pad. As illustrated in FIG. 5, the palm pad is not utilized, rather, interlock 80 is provided on the outer surface of handle 66 while a trigger 82 is provided on the inboard surface. Alternatively, a palm pad 84 shown in phantom outline in FIG. 5 can be provided, in which case interlock 86 would be located the left side of handle 66 in order to be grasped by the user's right thumb.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A miter saw comprising:

a base;

an arm assembly having a fixed end pivotally attached to the base, a free distal end forming a handle spaced outwardly therefrom and a central region therebetween provided with a rotary spindle supporting a cutting disc;

said handle comprising a D-shaped portion, said D-shaped portion including a grip portion, said D-shaped portion being connected to said central region via a rotatable joint to permit rotation of said handle, said handle and said rotatable joint having a common pivot axis therethrough;

said rotatable joint comprising a locking mechanism cooperating with the central region for permitting selective handle rotation about said pivot axis and for maintaining a selected orientation of said handle portion relative to said central region during a cutting operation of the miter saw.

2. The miter saw of claim 1 wherein the handle is rotatably adjustable between at least 0° and 30° from horizontal measured when the arm is lowered and the rotary spindle is horizontal.

3. The miter saw of claim 1 wherein the handle is rotatably adjustable between at least 0° and 40° from horizontal measured when the arm is lowered and the rotary spindle is horizontal.

4. The miter saw of claim 1 wherein the pivotal attachment of the arm to the base is adjustable about a vertical and a horizontal axis in order to enable a user to make a compound miter cut.

5. The miter saw of claim 4 wherein the handle is rotatable to the same extent that the arm is adjustable about the horizontal axis so as to enable the handle to be maintained in a horizontal orientation during a compound miter cut.

6. A miter saw comprising:

a base;

an arm assembly having a fixed end pivotally attached to the base, a free distal end forming a handle spaced outwardly therefrom, a central region therebetween provided with a rotary spindle supporting a cutting disc;

said handle comprising a first handle portion and a second handle portion spaced from said first handle portion, said first handle portion being connected to said central region via a rotatable joint to permit the rotation of said handle, said first handle portion and said rotatable joint having a common central longitudinal axis therethrough;

said rotatable joint comprising indicia and a corresponding alignment configuration to provide a visual indication to the amount of handle rotation of said second handle portion about said central longitudinal axis;

wherein the handle has a transverse oriented elongate grip portion sized for a user's fingers to wrap thereabout and a palm pad portion extending outwardly from the grip portion for a distance sufficient to underlie the heel portion of the palm of the user's hand so that as the user lowers the handle towards the base to cause the cutting disc to engage a work piece, the palm pad portion transmits downward force from the user's hand to the handle thereby minimizing torque on the user's wrist.

7. The miter saw of claim 6 wherein the elongate grip portion further comprises a lock-out switch extending transversely to the left of the grip portion adjacent the user's thumb and a trigger switch mounted on the grip portion extending inwardly from the grip portion adjacent a user's index finger.

8. The miter saw of claim 6 wherein the palm pad portion further comprises a soft elastomeric pad overlying a relatively rigid structural pad member.

9. The miter saw of claim 6 wherein the handle has a maximum vertical thickness when the handle is in a lowered horizontal orientation of between 1.5" and 2.5".

10. The miter saw of claim 6 wherein the handle has a fore and aft length measured along the arm axis of between 3" and 4.5".

11. The miter saw of claim 6 wherein the rotatable joint has sufficient travel to enable the elongate grip portion to be moved between a horizontal position and a position rotated at least 30° counter-clockwise about the arm axis therefrom measured when the arm is lowered and the rotary spindle is generally horizontal.

* * * * *